April 3, 1951     A. E. CHERNACK     2,547,375
CUTOFF DEVICE FOR TUBING

Filed Dec. 30, 1946     2 Sheets-Sheet 1

Inventor
Abel E. Chernack
By his Attorneys
Howson and Howson

April 3, 1951 A. E. CHERNACK 2,547,375
CUTOFF DEVICE FOR TUBING

Filed Dec. 30, 1946 2 Sheets-Sheet 2

Inventor
Abel E. Chernack
By his Attorneys
Howson and Howson

Patented Apr. 3, 1951

2,547,375

UNITED STATES PATENT OFFICE 2,547,375

CUTOFF DEVICE FOR TUBING

Abel E. Chernack, Bloomfield, Conn.; Mary Chernack, executrix of said Abel E. Chernack, deceased, assignor, by mesne assignments, to Wiremold Company, Hartford, Conn., a corporation of Connecticut Application December 30, 1946, Serial No. 719,215

14 Claims. (Cl. 164—61)

1

This invention relates to devices for cutting tubing. In the making of tubing from continuous strip material, the lengths of tubing desired are very often short and as the tubing is produced in a continuous length, it has been necessary either to cut the continuous tubing into the desired lengths after manufacture or to stop the machine making the tubing after a desired length has been made in order to sever it. One method requires additional labor and the other requires the repeated stopping and starting of the machine with a consequent loss of production for the machine and an increase in the unit cost of the product. Hence, an object of this invention is to provide means for automatically and repeatedly cutting tubing as it is produced without stopping the manufacture thereof. It is a further object of this invention to provide means of the type described which permits of readily changing the length of the sections into which the tubing is cut.

Other objects and advantages of the invention will become apparent as it is described in connection with the accompanying drawings.

In the drawings in which there is illustrated a preferred embodiment of this invention:

Fig. 3 is a view in elevation of the cam faces of an adjustable cutter controlling cam;

Fig. 4 is a side view of the cam of Fig. 3;

Fig. 5 is a view in elevation of the cam face of a second cutter controlling cam; and Fig. 6 is a side view of the cam of Fig. 5.

Figure 1:
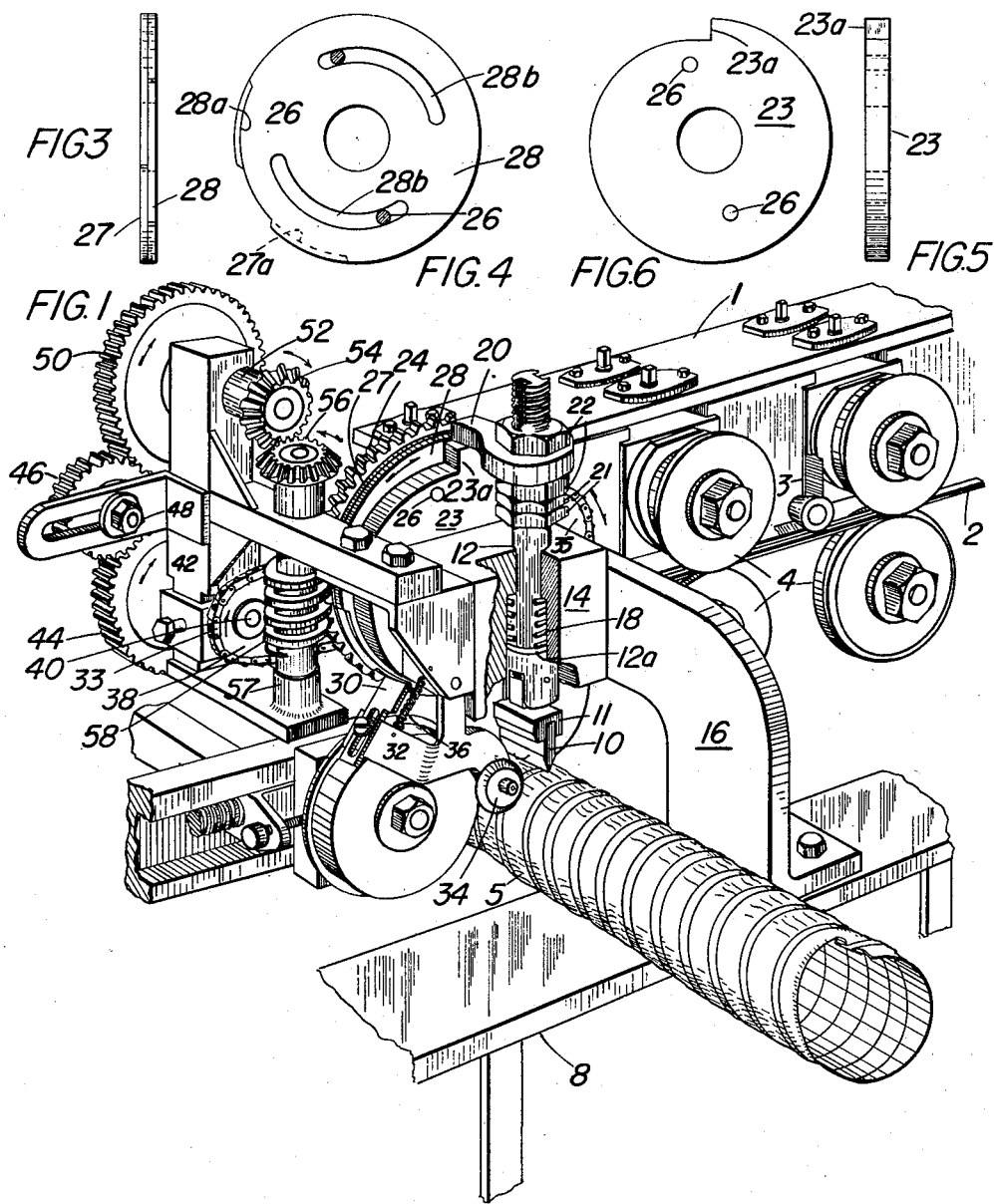
Fig. 1 is a perspective view of a device in accordance with this invention, the device being shown attached to a tube forming machine, only such parts of the tube forming machine being shown as are necessary to show the relation of the device thereto, parts of the device being broken away to show other parts more clearly.
Figure 2:
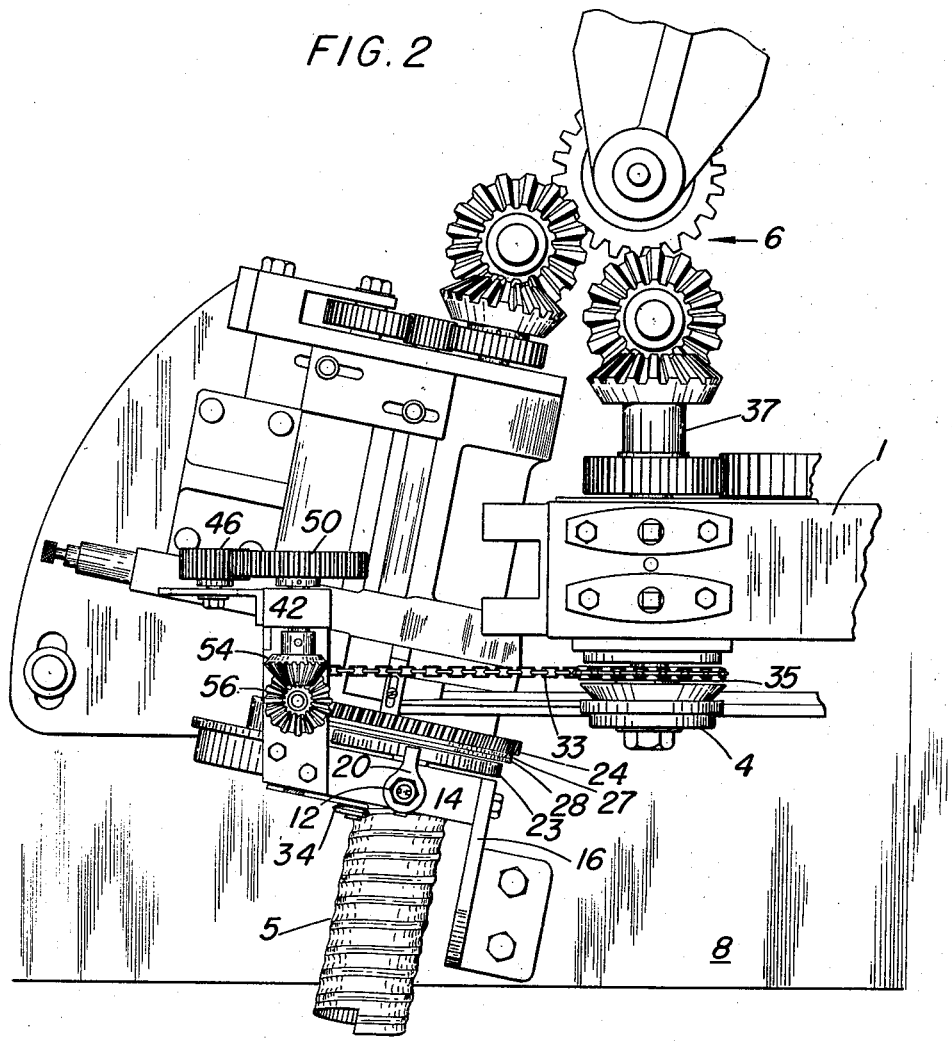
Fig. 2 is a top plan view of the structure shown in Fig. 1.

In the drawings, a cut-off device in accordance with this invention is shown applied to a tube forming machine 1 designed to form tubing from a continuous metal strip 2 and a continuous textile fabric strip 3. The machine comprises power-driven rolls 4 which shape the metal strip 2 and assemble the metal and textile strips into a single continuous strip which is formed into a spirally wound tubing 5 on a short continuously rotating mandrel (not shown) driven from the shaft of one of the rolls 4 through gearing 6.

The cut-off device comprises a chisel cutting means 10 secured in a head 11 pivotally connected to a plunger 12 slidably mounted in a suitable

2 support 14 carried by a bracket 16 mounted on the bed plate 8 of the machine. The plunger 12 is biased by a spring 18 compressed between a shoulder 12a on the plunger 12 and the inner wall of a recess in the support 14. The plunger 12 projects above the support 14 and has mounted on its threaded upper end a cam follower 20 adjustably positioned on the plunger 12 by lock nuts 22. The cam follower 20 projects into position to engage the face of cam 23 rotatably mounted on the support 14 and rotated by a worm wheel 24 secured to the cam 23 by bolts 26. Rotation of the cam 23 permits the cutter 10 to be operated by the spring 18 to cut the metal strip of the tubing when the raised portion 23a passes from beneath the cam follower 20. Nuts 21 adjustably positioned on the plunger 12 limit the downward movement of the cutter.

Secured between the worm wheel 24 and the cam 23 by the bolts 26 are cam disks 27 and 28 having arcuate slots as at 28b to receive the bolts 26 and permit relative adjustment of the disks 27 and 28. The edges of the disks 27 and 28 are cut away at 27a and 28a, respectively, to form a depressed portion the length of which may be varied by relatively adjusting the cam disks 27 and 28. Engaging the edges of the cam disks 27 and 28 is a cam follower 30 adjustably mounted on an arm 32 which is pivotally mounted on the support 14 and carries a roller cutter 34 positioned to engage the textile strip of the tubing. A spring 36 connected to the arm 32 and support 14 biases the arm 32 to hold the cam follower 30 against the cam disks 27 and 28, and operates the arm 32 to bring the cutter 34 into engagement with the textile portion of the tubing when the cam follower 30 engages the depressed portions of the edges of the cam disks. In practice the disks 27 and 28 are adjusted so that the cutter 34 engages the fabric portion of the tubing for a complete revolution of the tubing. However, if it is desired to have the cutting action last longer than a revolution of the tubing, the adjustment of discs 27 and 28 may be varied to increase the length of the depressed portion, thus increasing the duration of the cutting action to the desired amount.

To drive the worm wheel 24 there is provided a drive chain connection 33 from a sprocket 35 mounted on the drive shaft 37 of the adjacent upper roll 4 to a sprocket 38 mounted on an end of a shaft 40 rotatably mounted in a journal box adjustably mounted in a suitable support 42 secured to the support 14. Fixed on the opposite end of the shaft 40 is a gear 44 which meshes with an idler gear 46 journaled on a stub shaft 48 adjustably mounted on the support 42. The idler gear 46 meshes with a gear 50 fixed on an end of a shaft 52 journaled in the support 42 and having fixed on its other end a bevel gear 54. The gear 54 meshes with a bevel gear 56 fixed on the upper end of a vertically arranged shaft 57 journaled in the support 42 and having fixed thereon adjacent its other end, a worm 58 which engages the worm wheel 24.

When the tube forming machine is in operation, the strips 2 and 3 are joined and then spirally wound on the mandrel to form the tubing 5. Operation of the forming rolls 4 drives the gear 44 through the chain 33. The gear 44, operating through the gear train and worm and worm wheel operates the cams 23 and 27 and 28. Operation of the cam 23 causes the operation of the cutter 10 to sever the metallic strip on the mandrel. In order to operate the cutter after the formation of a predetermined length of tubing the gear 44 may be changed to provide a gearing ratio such that the cam 23 will make a single revolution and cause the operation of the cutter 10 after the predetermined length is formed. Mounting the shaft 40 in a journal box adjustable in the support 42 permits of adjusting gears 44 of different diameters to properly mesh with the idler gear 46.

The cams 27 and 28 are mounted to revolve with the cam 23. The making of these cams relatively adjustable permits of varying the period of engagement of the cutter roll 34 with the fabric of the tubing on the mandrel so as to ensure engagement of the cutter 34 with the tubing for one complete revolution of the tubing irrespective of the diameter of the tubing or the length of the sections into which the tubing is divided.

From the foregoing it may be observed that the chisel cutter 10 cuts through the metal part of the tubing as the cutter descends to the mandrel on which the tubing is being formed. This cut, being in an axial or longitudinal direction, only partially severs the fabric strip which is between the adjacent convolutions of the metal strip. Completion of the cutting of the fabric is accomplished by the rotary cutter 34 which is pressed against the mandrel within the tubing by spring 36 as described. This cutting is peripheral and need only proceed from the axial cut until the tubing has completely revolved to bring the axial cut again under the rotary cutter so that the two cuts intersect at beginning and end. The two cuts thus completely sever the tubing.

It is apparent that the invention while particularly useful for severing tubing made of metal and fabric, is useful also for tubing of metal and any flexible or collapsible material equivalent to fabric. Hence in the appended claims the word "fabric" includes such equivalents.

Modifications within the scope of the invention will occur to those skilled in the art. The invention therefore is not limited to the specific embodiment shown.

What is claimed is:

1. In a cut-off device for continuous tube forming machines, dual cutting means comprising a reciprocating cutter making a longitudinal cut and a rotary cutter making a peripheral cut intersecting said longitudinal cut, and means operated by said tube forming machine for operating said cutting means to cut the tubing into uniform lengths.

2. In a cut-off device for continuous tube forming machines, dual cutting means comprising a reciprocating cutter making a longitudinal cut and a rotary cutter making a peripheral cut intersecting said longitudinal cut, cam means controlling the operation of said cutting means, and means operating said cam means from said tube forming machine to initiate operation of said cutting means to cut the tubing into uniform lengths.

3. In a cut-off device for continuous tube forming machines which form tube of metal and flexible material, a cutting chisel, cam means controlling the operation of said cutting chisel, a cutting wheel, a second cam means controlling the operation of said cutting wheel, and means operating said cam means from the tube forming machine to provide cutting strokes of said cutting chisel and predetermined applications of said cutting wheel on the periphery of the flexible material to cut the composite tubing into uniform lengths.

4. In a cut-off device for machines forming continuous spirally wound composite metal and fabric tubing, metal cutting means, fabric cutting means, means operating said metal cutting means to sever the metal by a stroke, means operating said fabric cutting means to sever the fabric during a predetermined period, and means operating said cutting operating means from the tube forming machine to cut the tubing into uniform lengths.

5. In a cut-off device for rotating composite metal and fabric tubing, a cutting chisel, a cutting wheel, means operating said cutting chisel to sever the metal by a blow, and means operating the cutting wheel to sever the fabric by a complete revolution of the tubing.

6. In a cut-off device for rotating composite metal and fabric tubing, a cutting chisel for cutting the metal of said tubing, cam means controlling said cutting chisel, a cutting wheel for cutting the fabric of said tubing, cam means rendering said cutting wheel operative during a complete revolution of the tubing and means operating said cam means to cut the tubing.

7. In a cut-off device for rotating and advancing composite metal and fabric tubing, a cutting chisel for cutting the metal of the tubing, spring means for operating said cutting chisel, cam means controlling said cutting chisel, a cutting wheel for cutting fabric of said tubing, spring means for engaging said cutting wheel with the fabric, a second cam means controlling the operation of said cutting wheel, and means operating said cam means to operate said cutting means upon a predetermined advance of the tubing.

8. In a cut-off device for rotating and advancing hollow composite metal and fabric tubing of the type having helical convolutions of metal with fabric between them, cutting means severing a convolution of the metal of the tubing, cutting means acting circumferentially to sever the fabric of the tubing, and means operating said cutting means upon a predetermined advance of the tubing.

9. In a cut-off device for rotating and advancing hollow composite metal and fabric tubing of the type having helical convolutions of metal with fabric between them, cutting means for the metal of the tubing, cutting means acting transversely to the axis of the tubing the fabric of the tubing, operating means for said cutting means, and means initiating the operation of said operating means upon a predetermined advance of said tubing.

10. In a cut-off device for rotating and advancing composite metal and fabric tubing, a cutting chisel for cutting the metal of the tubing, spring means for operating said cutting chisel, cam means controlling said cutting chisel, a cutting wheel for cutting fabric of the tubing, spring means for engaging said cutting wheel with the fabric, a second cam means controlling the operation of said cutting wheel, said second cam means being adjustable to vary the operative period of said cutting wheel, and means operating said cam means to operate said cutting means upon a predetermined advance of the tubing.

11. In a device for cutting-off rotating and advancing composite metal and fabric tubing, a flat cutting edge for cutting the metal of the tubing, spring means for operating said cutting edge, a cam controlling said cutting edge, a cutting wheel for cutting the fabric of the tubing, spring means for engaging said cutting wheel with the fabric, a plurality of relatively adjustable cams controlling the engagement of said cutting wheel with the fabric, said cams being relatively adjustable to vary the operative period of said cutting wheel, and means operating said cams to operate said cutting means upon a predetermined advance of the tubing.

12. In a device for cutting-off rotating and advancing composite metal and fabric tubing, a flat cutting edge for cutting the metal of the tubing, spring means for operating said cutting edge, a cam controlling said cutting edge, a cutting wheel for cutting the fabric of the tubing, spring means for engaging said cutting wheel with the fabric, a plurality of cams having cooperating cam faces controlling the operation of said cutting wheel, said cooperating cam faces being relatively adjustable to vary the operative period of said cutting wheel and means operating said cams to operate said cutting means upon a predetermined advance of the tubing.

13. In a device for cutting-off rotating and advancing continuous tubing, a mandrel on which the tubing is formed, cutting means cutting the tubing on the mandrel, a plunger, guiding means for said plunger, means pivotally connecting said plunger and cutting means, a spring for operating said plunger, a cam follower carried by said plunger, a cam engaging said cam follower and controlling operation of said plunger, and means operating said cam to initiate operation of said cutting means upon a predetermined advance of the tubing.

14. In a device for cutting-off rotating and advancing composite hollow metal and fabric tubing, a cutting wheel acting transversely to the axis of the tubing, means for engaging said cutting wheel with the tubing, cam means controlling the engagement of said cutting wheel with the tubing, said cam means being adjustable to vary the operative period of said cutting wheel, and means operating said cam means to initiate operation of said cutting wheel upon a predetermined advance of the tubing.

ABEL E. CHERNACK.

REFERENCES CITED

The following references are of record in the file of this patent:

UNITED STATES PATENTS

| Number | Name | Date |
|---|---|---|
| 677,126 | Gilbert | June 25, 1901 |
| 763,124 | Stewart | June 21, 1904 |
| 873,430 | Harter | Dec. 10, 1907 |
| 982,770 | Patterson | Jan. 24, 1911 |
| 1,501,774 | Heeter | July 15, 1924 |
| 1,955,410 | Colbie | Apr. 17, 1934 |
| 2,160,497 | Garrett | May 30, 1939 |
| 2,319,198 | Barrans | May 18, 1943 |
| 2,404,424 | Balla | July 23, 1946 |